Patented Oct. 10, 1933

1,930,135

UNITED STATES PATENT OFFICE 1,930,135

CELLULOSE ORGANIC ESTER COMPOSITION CONTAINING A LOWER ALKYL ESTER OF A SUBSTITUTED BENZOIC ACID

Henry B. Smith and Stewart J. Carroll, Rochester, N. Y., assignors to Eastman Kodak Company, Rochester, N. Y., a corporation of New York No Drawing. Application December 17, 1932
Serial No. 647,824

12 Claims. (Cl. 106—40)

This invention relates to compositions of matter in which cellulose organic esters, such as cellulose acetate, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and molded products, artificial silk, varnishes or lacquers, coating compositions and the like.

One object of this invention is to produce compositions of matter which may be made into permanently transparent, strong and flexible sheets or films of desired thinness which are substantially waterproof, are unaffected by ordinary photographic fluids, and possess the desired properties of a support for sensitive photographic coatings. Another object of our invention is to produce compositions of matter which are capable of easy and convenient manipulation in the plastic and analogous arts, such as in the manufacture of sheets, films, artificial silk filaments, varnishes, lacquers and the like, and to produce compositions which will not injure, or be injured by, the substances or surfaces with which they are associated during manufacture. Another object of our invention is to produce compositions which can be molded at elevated temperatures and high pressures to produce plastic products having the desirable properties of celluloid. Still another object of our invention is to produce compositions of matter containing cellulose acetate with a high degree of flexibility, softness and pliability. Other objects will become apparent to those skilled in the art to which this invention pertains.

While cellulose acetate has been known for decades, it has also been known that to utilize it in the various plastic arts it is necessary to mix therewith various plasticizing or conditioning agents. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments, molded compounds and the like. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not compatible, or at least not sufficiently compatible, with cellulose acetate to be used as plasticizers in cellulose acetate compositions.

We have discovered that valuable properties may be induced in and/or contributed to compositions containing organic esters of cellulose, such as cellulose acetate, by adding thereto as a plasticizing compound a lower alkyl ester of a substituted benzoic acid, selected from the group consisting of butyl o-methoxy benzoate, ethyl p-methoxy benzoate, and propyl p-hydroxy benzoate. The particularly useful properties which these compounds induce in or contribute to cellulosic compositions containing them are hereinafter enumerated.

Butyl o-methoxybenzoate may be prepared as follows. 1940 grams of butyl salicylate and 1 liter of benzene are placed in a 5-liter flask fitted with a stirrer, a reflux condenser, and a dropping funnel. Through the condenser is added 1 kg. of 40% sodium hydroxide solution with constant stirring, while at the same time 1260 grams of methyl sulfate is added through the dropping funnel, the sodium hydroxide always being kept in slight excess. The heat of reaction is sufficient to cause refluxing of the benzene. When all has been added, the two layers formed are separated, and the benzene layer is returned to the flask and treated, in the same manner as before, with 1 kg. of 40% sodium hydroxide solution and 960 grams of methyl sulfate. The benzene layer is again separated off, washed with dilute alkali to remove unchanged butyl salicylate, and distilled under reduced pressure. Butyl o-methoxybenzoate boils at 185–186° C. at 50 mm. pressure.

Ethyl p-methoxybenzoate may be prepared as follows. 10 gram mols of p-methoxybenzoic acid, 62.5 g. moles of ethyl alcohol, and 300 cc.

of concentrated sulfuric acid are mixed together in a 5-liter flask and then refluxed for 15 hours over a steam bath. The reaction mixture is then poured, with hand stirring, into a crock containing about 6 liters of water and about one to two kilograms of cracked ice. Ethyl p-methoxybenzoate precipitates and is filtered by suction, washed with water, and then placed in a 12-liter flask with about 5 liters of benzene and mechanically stirred for about one hour until all the solid has gone into solution. The water layer is separated and rejected. The benzene layer, containing the ethyl p-methoxybenzoate, is treated with a small amount of solid potassium carbonate with mechanical stiring for about one-half hour in order to neutralize it, and then filtered by gravity. The benzene is removed by distilling under slightly reduced pressure over a steam bath. The residue is distilled under reduced pressure over a free flame. Ethyl p-methoxybenzoate boils at 134–135° C. at 20 mm. pressure.

Propyl p-hydroxybenzoate may be prepared as follows: 2 kg. of p-hydroxybenzoic acid and 8 kg. of propyl alcohol are placed in a 22-liter flask equipped with a reflux condenser, and heated on a steam bath until the p-hydroxybenzoic acid has dissolved. 10 cc. of concentrated sulfuric acid is then cautiously added through the condenser, and the solution is heated for 48 hours. Most of the alcohol is then distilled off, and with it the water formed during the reaction. The residue is poured into a mixture of ice and water, filtered, and the precipitate washed free of acid. n-Propyl p-hydroxybenzoate crystallizes from methyl alcohol in hexagonal platelets which melt at 95–96° C.

In order that those skilled in this art may better understand our invention we would state, by way of illustration, that for the manufacture of photographic film base or other sheets our new compositions of matter may be compounded as follows: 100 parts of acetone-soluble cellulose acetate, i. e. cellulose acetate containing from about 36% to 42% acetyl radical, approximately, is dissolved with stirring at atmospheric temperature in 300 to 500 parts, preferably 400 parts, by weight, of acetone. To this solution may be added from 10 to 50 parts by weight of butyl o-methoxybenzoate or of ethyl p-methoxybenzoate or from 10 to 30 parts by weight of n-propyl p-hydroxybenzoate. Within the limits stated, the amount of plasticizer may be decreased or increased, depending upon whether it is desired to decrease or increase, respectively, the properties which these plasticizers contribute to the finished product. The amount of solvent employed may also be increased or decreased, depending upon whether it is desired to have a more or less freely flowing composition, respectively.

A composition of matter prepared as above described may be deposited upon any suitable film-forming surface and the acetone evaporated therefrom to form a film or sheet, in a manner well known to those skilled in the art. A film so produced has permanently brilliant transparency and low inflammability, burning no more readily than ordinary newsprint. Films or sheets produced in accordance with our invention are tough and flexible. For instance, films of cellulose acetate plasticized with from 10% to 50% (10 to 50 parts by weight based on the cellulose acetate) of butyl o-methoxybenzoate had an initial flexibility of from 35% to 235% greater than that of film containing no plasticizer, films containing from 15% to 50% of ethyl p-methoxybenzoate had an initial flexibility of from 65% to 365% greater than that of film containing no plasticizer, and films containing from 10% to 30% of n-propyl p-hydroxybenzoate had an initial flexibility of from 35% to 135% greater than that of film containing no plasticizer. Furthermore, film so plasticized maintains flexibility in a superior fashion. For instance, at 65° C., films containing from 10% to 50% of butyl o-methoxybenzoate maintained flexibility for 170 days, films containing from 15% to 50% of ethyl p-methoxybenzoate maintained flexibility for over 250 days, and films containing from 10% to 30% of n-propyl p-hydroxybenzoate maintained flexibility for over 198 days, whereas an unplasticized film became brittle in 30 days. This indicates that films or sheets so plasticized will withstand ordinary usage satisfactorily for many years.

Other similar solvents (instead of acetone) which are compatible with the cellulose acetate and our new plasticizers will also occur to those skilled in this art, such as ethylene chloride-alcohol mixtures. In like manner these plasticizers may be compounded with other single organic esters of cellulose, such as cellulose propionate, butyrate and the like, or with mixed organic esters, such as cellulose acetopropionate, cellulose aceto-butyrate, cellulose aceto-lactate, cellulose aceto-tartrate or the like, a suitable solvent which will dissolve both the cellulosic derivative and the plasticizer being employed, such, for instance, as an alkylene chloride with or without the addition of alcohol. The compatibility of n-propyl p-hydroxy benzoate with cellulose esters of the higher fatty acids is questionable; these have therefore not been included.

Inasmuch as our above-described compositions of matter are useful in the production of films and sheets, it will be apparent that our new plasticizers may also be employed with advantage in the other branches of the plastic art. For instance, our novel plasticizers may be employed with advantage in connection with a number of the known lacquer and varnish formulæ with which they may be found to be compatible. In such cases the plasticizer is usually first put into solution in the cellulose derivative solution, and if non-solvents are added for the purpose of cheapening the composition they are added only to such an extent as will not precipitate the derivative from solution. Other uses within the scope of our invention will also suggest themselves to those skilled in the art and are to be included within the scope of the claims appended hereto.

Our novel plasticizers may also be advantageously used as plasticizers in cellulose organic ester molding compositions. For instance, when about 30% (30 parts by weight based on the cellulose acetate) of butyl o-methoxybenzoate or of ethyl p-methoxybenzoate or of n-propyl p-hydroxybenzoate is homogeneously mixed with cellulose acetate, the mixture may be converted into a hard, transparent or translucent plastic product by molding at a temperature of 140–160° C. and a pressure of 2500 to 4000 pounds per square inch for a period of from 2 to 5 minutes, in a manner already known to those skilled in molding compounds of that nature.

Moreover, we have found that, upon the addition to cellulose acetate of approximately 100% of butyl o-methoxybenzoate or of ethyl p-methoxybenzoate, quite unexpected compatibility of the plasticizer with the cellulose acetate exists and also that quite unexpected flexibility, plasticity and clarity of the final product result. Contrary to experience in most cases where such a large proportion of plasticizer is used, no exudation or crystallizing out of the plasticizer occurs. Compositions containing approximately 100% of butyl o-methoxybenzoate or of ethyl p-methoxybenzoate have great utility where a highly flexible compound is desired, such as in the coating of a base (for instance, cloth or other fabric) in the production of artificial leather, or in the production of relatively thin sheets wherein more than the usual flexibility is important. Such a composition, if converted, for instance, into sheet form will be found to be supple and non-rigid, and to have the ability to conform readily to a surface upon which it may be placed, and this even at atmospheric temperatures.

These novel compositions of matter are produced by merely mixing the plasticizer with cellulose acetate and then adding sufficient of a common solvent, such as acetone, whereupon an intimate mixture of the plasticizer with the cellulose acetate results. The amount of acetone or other common solvent to be employed varies, of course, within rather wide limits depending upon the fluidity of the composition desired. 100 parts of acetone will suffice for some purposes, although we prefer to use 400 parts. Various high boilers or evaporation retardents, such as ethyl lactate, amyl acetate or the like may also be added if desired, as is well known in this art.

The compositions of matter so produced may then be coated into sheets in the usual way by depositing them upon plates or rolls and permitting the solvent to evaporate. If our novel compositions are to be employed in the manufacture of artificial leather, they may be coated upon, for instance, a cloth support and the solvent permitted to evaporate, or the cloth support may be caused to pass through the cellulose acetate-plasticizer composition and permitted to absorb the solution, the solvent in the coating being then permitted to evaporate. In either case, the solvent may, of course, be recovered if desired by condensing the vapors, etc.

While above and in certain of the claims appended hereto, we have referred to the use of a plasticizer in approximately equal proportions, namely in a ratio of approximately 100%, it will be understood that within this terminology variations of from 10% to 15% less than 100% of plasticizer and as much as 25% to 50% more than 100% of the plasticizer may in some instances be desirable.

What we claim as our invention and desire to be secured by Letters Patent of the United States is:

1. A composition of matter comprising a cellulose ester of a lower aliphatic acid and a plasticizer selected from the group consisting of butyl o-methoxybenzoate, ethyl p-methoxybenzoate, and propyl p-hydroxybenzoate.

2. A composition of matter comprising cellulose acetate and a plasticizer selected from the group consisting of butyl o-methoxybenzoate, ethyl p-methoxybenzoate, and propyl p-hydroxybenzoate.

3. A composition of matter comprising cellulose acetate and butyl o-methoxybenzoate.

4. A composition of matter comprising cellulose acetate and ethyl p-methoxybenzoate.

5. A composition of matter comprising cellulose acetate and propyl p-hydroxybenzoate.

6. A composition of matter comprising 100 parts of cellulose acetate and about 10 to 100 parts, by weight, of butyl o-methoxybenzoate.

7. A composition of matter comprising 100 parts of cellulose acetate and about 10 to 100 parts, by weight, of ethyl p-methoxybenzoate.

8. A composition of matter comprising 100 parts of cellulose acetate and about 10 to 30 parts by weight, of propyl p-hydroxybenzoate.

9. A transparent, flexible sheet comprising 100 parts of a cellulose ester of a lower aliphatic acid and about 10 to 30 parts of a plasticizer selected from the group consisting of butyl o-methoxybenzoate, ethyl p-methoxybenzoate, and propyl p-hydroxybenzoate.

10. A transparent, flexible sheet comprising 100 parts of cellulose acetate and about 10 to 30 parts of a plasticizer selected from the group consisting of butyl o-methoxybenzoate, ethyl p-methoxybenzoate, and propyl p-hydroxybenzoate.

11. A molding composition adapted for molding under elevated temperatures and high pressures, comprising a cellulose ester of a lower aliphatic acid and a plasticizer selected from the group consisting of butyl o-methoxybenzoate, ethyl p-methoxybenzoate, and propyl p-hydroxybenzoate.

12. A molding composition adapted for molding under elevated temperatures and high pressures, comprising cellulose acetate and a plasticizer selected from the group consisting of butyl o-methoxybenzoate, ethyl p-methoxybenzoate, and propyl p-hydroxybenzoate.

HENRY B. SMITH.
STEWART J. CARROLL.